United States Patent
Lee et al.

(10) Patent No.: US 11,211,785 B2
(45) Date of Patent: Dec. 28, 2021

(54) DYNAMIC BATTERY VOLTAGE RESTRICTION FOR HAZARDOUS ENVIRONMENTS

(71) Applicant: Motorola Solutions, Inc., Chicago, IL (US)

(72) Inventors: Wai Mun Lee, Ipoh (MY); Macwien Krishnamurthi, Shah Alam (MY); Chen Kok Yeoh, Bukit Mertajam (MY); Kow Chee Chong, Bayan Lepas (MY); Muhamad Ridzuan Azizan, Baling (MY)

(73) Assignee: Motorola Solutions, Inc., Chicago, IL (US)

(*) Notice: Subject to any disclaimer, the term of this patent is extended or adjusted under 35 U.S.C. 154(b) by 287 days.

(21) Appl. No.: 16/590,816

(22) Filed: Oct. 2, 2019

(65) Prior Publication Data
US 2021/0104886 A1    Apr. 8, 2021

(51) Int. Cl.
| | | |
|---|---|---|
| *H02H 7/18* | (2006.01) | |
| *G05F 3/24* | (2006.01) | |
| *H02J 7/00* | (2006.01) | |

(52) U.S. Cl.
CPC ............ *H02H 7/18* (2013.01); *G05F 3/24* (2013.01); *H02J 7/0029* (2013.01);
(Continued)

(58) Field of Classification Search
CPC ......... H02H 7/18; H02H 11/006; H02H 9/04; G05F 3/24; H02J 7/0029; H02J 7/0063;
(Continued)

(56) References Cited

U.S. PATENT DOCUMENTS

| 3,708,694 A | 1/1973 | Evans |
|---|---|---|
| 4,945,262 A | 7/1990 | Piasecki |

(Continued)

FOREIGN PATENT DOCUMENTS

| EP | 3226368 | 10/2017 |
|---|---|---|
| WO | 2019/125495 A1 | 6/2019 |

OTHER PUBLICATIONS

PCT Notification of Transmittal of International Search Report and Written Opinion in International Application No. PCT/US2020/053037, dated Nov. 30, 2020, 17 pages.

(Continued)

*Primary Examiner* — Stacy Whitmore
(74) *Attorney, Agent, or Firm* — Baker Botts L.L.P.

(57) ABSTRACT

A method for dynamic limiting of battery voltage includes determining that a voltage delivered by a battery exceeds a predefined maximum safe voltage for operation of a portable electronic device in a hazardous environment and, in response, enabling a voltage restriction circuit in a supply line between the battery and the portable electronic device to reduce the voltage delivered by the battery below the maximum safe voltage, and supplying electrical power to the portable electronic device at the reduced voltage. Enabling the voltage restriction circuit may include deactivating a MOSFET switch that includes a forward biased body diode to allow the body diode to provide a fixed voltage drop. The method also includes determining that the voltage delivered by the battery no longer exceeds the maximum safe voltage and, in response, disabling the first voltage restriction circuit by activating the MOSFET, thus allowing the body diode to be bypassed.

20 Claims, 7 Drawing Sheets

(52) U.S. Cl.
CPC ......... *H02J 7/0063* (2013.01); *H02J 7/00306* (2020.01); *H02J 2007/0067* (2013.01)

(58) Field of Classification Search
CPC ........... H02J 7/00306; H02J 2007/0067; H02J 7/007182; H02J 7/00308; H02J 7/002; H02J 7/027; H02J 7/1461; H02J 7/166; H02J 7/0072; H02J 7/008; H02J 7/0086; H02J 7/042; H02J 7/045; H02J 7/085; H02J 2007/10; H02J 7/125; H02J 7/0026; H02J 7/006; H02J 7/00; Y02E 60/10; H01M 2010/4271; H01M 2220/30; H01M 10/425
See application file for complete search history.

(56) References Cited

U.S. PATENT DOCUMENTS

| | | | |
|---|---|---|---|
| 5,539,299 A * | 7/1996 | Fernandez | H02J 7/0031 320/163 |
| 7,567,119 B2 * | 7/2009 | Rallabandi | G05F 1/573 327/541 |
| 7,667,435 B2 * | 2/2010 | Denning | H01M 10/42 320/132 |
| 7,952,321 B2 | 5/2011 | Spartano | |
| 2005/0269992 A1 * | 12/2005 | Lai | H02J 7/0031 320/134 |
| 2020/0350779 A1 | 11/2020 | Tikhonski et al. | |

OTHER PUBLICATIONS

"Integrated Voltage Limiters for Automotive Applications." *Maxim*, https://www.maximintegrated.com/en/app-notes/index.mvp/id/3895, Sep. 13, 2006; 4 pages, Sep. 13, 2006.

"Ultra-Small, Overvoltage Protection/Detection Circuits." MAX16010-MAX16014, 2015; 12 pages.

* cited by examiner

DYNAMIC BATTERY VOLTAGE RESTRICTION FOR HAZARDOUS ENVIRONMENTS

BACKGROUND OF THE INVENTION

Feature rich portable electronic devices, including portable electronic communication devices, require ever increasing amounts of energy from batteries in terms of higher peak load currents and higher average load currents. For example, radios have evolved from simple analog devices with peak transmission power demands to multi-function computing systems in which different software-controlled modes have different peak current demands. Battery packs and battery cells thereof are growing in terms of capacity and increased voltage ratings due to the introduction of improved battery chemistries and a demand for higher power and capacity.

Hazardous locations are sometimes defined as places where fire or explosion hazards may potentially exist due to flammable gases, flammable liquid-produced vapors, combustible liquid-produced vapors, combustible dusts, or ignitable fibers or filings that are present in the air in quantities sufficient to produce explosive or ignitable mixtures. Electrical equipment that is meant to be installed in such hazardous locations, including land mobile radios and other portable electronic communication devices, should be specially designed and tested to ensure that they do not initiate an explosion due to arcing contacts or the high surface temperature of the equipment. For example, a radio may be restricted in terms of power consumption or current consumption to satisfy compliance with one or more safety standards, including Appareils destinés á étre utilisés en ATmosphéres EXplosibles (ATEX), Underwriters Laboratories (UL), and International Electrotechnical Commission System for Certification to Standards Relating to Equipment for Use in Explosive Atmospheres (IECEx). The maximum allowable capacitance listed in the HAZLOC standards for portable electronic devices with a battery rated at 8.4V is 380 uF. For portable electronic devices with a battery rated at 8.8V, the maximum allowable capacitance is significantly degraded to only 240 uF.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
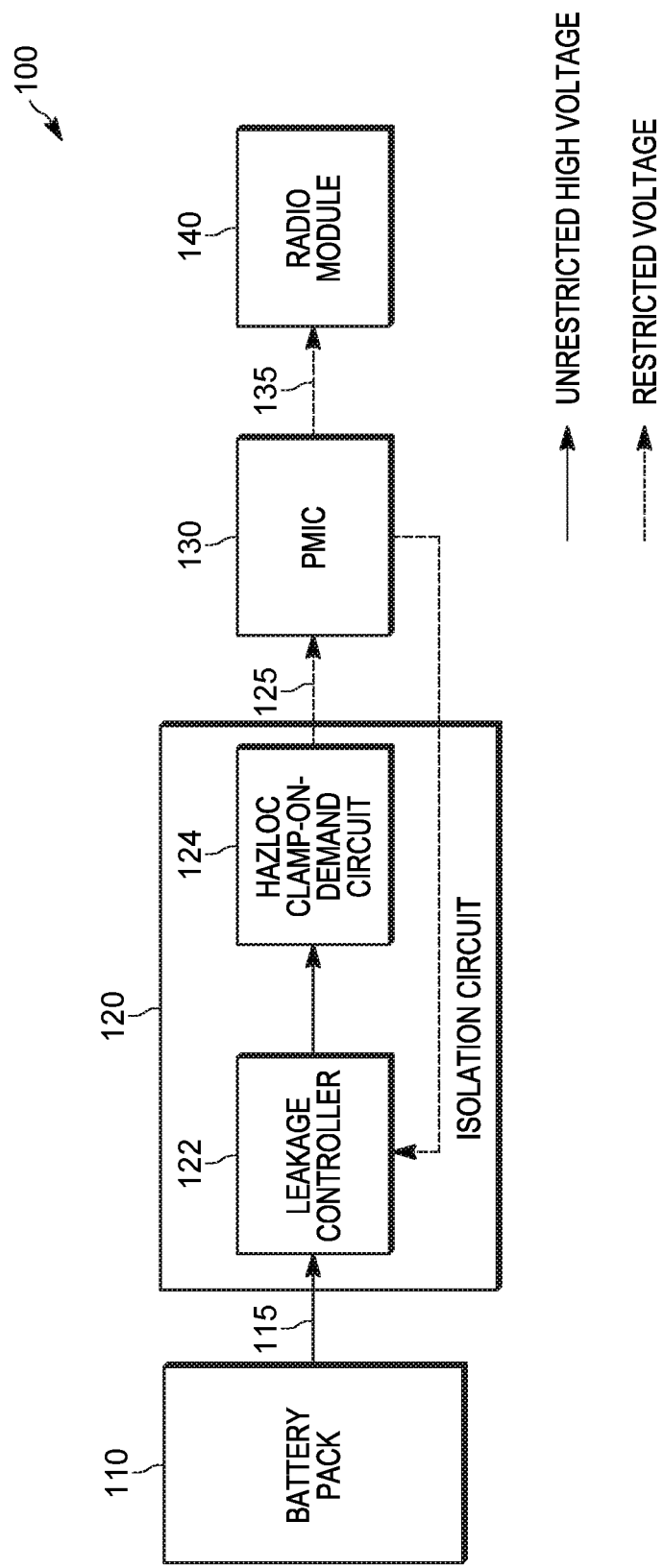
FIG. 1 is a block diagram illustrating selected elements of an example portable electronic communication device configured for operation in a hazardous environment, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and apparatus for dynamic battery voltage restriction for hazardous environments. In one embodiment, a disclosed method for providing on-demand reduction of battery output voltage includes determining, prior to supplying electrical power from a battery to a portable electronic device, that a voltage delivered by the battery exceeds a predefined maximum safe voltage for operation of the portable electronic device in a hazardous environment and, in response to determining that the voltage delivered by the battery exceeds the maximum safe voltage, enabling a first voltage restriction circuit in a supply line between the battery and the portable electronic device to reduce the voltage delivered by the battery below the maximum safe voltage and supplying electrical power to the portable electronic device at the reduced voltage. Enabling the first voltage restriction circuit may include deactivating a metal-oxide-semiconductor field-effect transistor (MOSFET) switch that includes a forward biased body diode. The method also includes determining, subsequent to enabling the first voltage restriction circuit, that the voltage delivered by the battery no longer exceeds the maximum safe voltage and, in response to determining that the voltage delivered by the battery no longer exceeds the maximum safe voltage, disabling the first voltage restriction circuit.

In various embodiments, the operation of the first voltage restriction circuit may be controlled by one or more passive devices. The first voltage restriction circuit may include the forward biased body diode and, when enabled, the forward biased body diode may be configured to reduce the battery voltage across the supply line by a fixed amount. Disabling the first voltage restriction circuit may include activating the MOSFET switch and supplying electrical power to the portable electronic device while bypassing the body diode.

In various embodiments, the first voltage restriction circuit may be one of a plurality of voltage restriction circuits in the supply line between the battery and the portable electronic device and the method may further include, prior to enabling the first voltage restriction circuit, enabling a second voltage restriction circuit in the supply line between the battery and the first voltage restriction circuit to reduce the battery voltage across the supply line by a fixed amount. Determining that the voltage delivered by the battery exceeds the maximum safe voltage may include determining that a reduction of the battery voltage across the supply line by the second voltage restriction circuit was not sufficient to reduce the voltage delivered by the battery below the maximum safe voltage.

In one embodiment, a disclosed voltage limiting circuit includes a first metal-oxide-semiconductor field-effect transistor (MOSFET) switch of a first voltage restriction stage of the voltage limiting circuit in a battery supply line, the first MOSFET switch including a first forward biased body diode configured to reduce a voltage delivered by a battery across the battery supply line by a first fixed amount while the first MOSFET switch is deactivated and a first comparator circuit of the first voltage restriction stage communicatively coupled to the first MOSFET switch. The first comparator may be configured to determine whether the voltage delivered by the battery exceeds a predefined maximum safe voltage for operation of a portable electronic device in a hazardous environment, to output a first control signal to deactivate the first MOSFET switch responsive to a determination that the voltage delivered by the battery exceeds the predefined maximum safe voltage and to output a second control signal to activate the first MOSFET switch responsive to a determination that the voltage delivered by the battery does not exceed the predefined maximum safe voltage.

In various embodiments, the first comparator circuit may be further configured to determine, subsequent to outputting the first control signal, that the voltage delivered by the battery no longer exceeds the predefined maximum safe voltage for operation of the portable electronic device in the hazardous environment and to output the second control signal to activate the first MOSFET switch responsive to the determination that the voltage delivered by the battery no longer exceeds the predefined maximum safe voltage.

In various embodiments, the voltage limiting circuit may further include a second MOSFET switch of a second voltage restriction stage of the voltage limiting circuit following the first voltage restriction stage in the battery supply line, the second MOSFET switch including a second forward biased body diode configured to reduce the voltage delivered to the second voltage restriction stage across the supply line by a second fixed amount while the second MOSFET switch is deactivated, and a second comparator circuit of the second voltage restriction stage communicatively coupled to the second MOSFET switch. The second comparator circuit may be configured to determine whether the voltage delivered to the second voltage restriction stage exceeds the predefined maximum safe voltage, to output a third control signal to deactivate the second MOSFET switch responsive to a determination that the voltage delivered to the second voltage restriction stage exceeds the predefined maximum safe voltage, and to output a fourth control signal to activate the second MOSFET switch responsive to a determination that the voltage delivered to the second voltage restriction stage does not exceed the predefined maximum safe voltage. the first fixed amount and the second fixed amount may be substantially the same.

In various embodiments, the voltage limiting circuit may further include a third MOSFET switch of a third voltage restriction stage of the voltage limiting circuit following the second voltage restriction stage in the battery supply line, the third MOSFET switch including a third forward biased body diode configured to reduce the voltage delivered to the third voltage restriction stage across the supply line by a third fixed amount while the third MOSFET switch is deactivated, and a third comparator circuit of the third voltage restriction stage communicatively coupled to the third MOSFET switch. The third comparator may be configured to determine whether the voltage delivered to the third voltage restriction stage exceeds the predefined maximum safe voltage, to output a fifth control signal to deactivate the third MOSFET switch responsive to a determination that the voltage delivered to the third voltage restriction stage exceeds the predefined maximum safe voltage, and to output a sixth control signal to activate the third MOSFET switch responsive to a determination that the voltage delivered to the third voltage restriction stage does not exceed the predefined maximum safe voltage.

In various embodiments, the first comparator circuit may include an internal reference voltage whose value is dependent on the predefined maximum safe voltage. In various embodiments, the voltage limiting circuit be an element of the battery. In various embodiments, the portable electronic device may be coupled to the battery and configured to receive electrical power from the battery and the voltage limiting circuit may be an element of the portable electronic device.

In one embodiment, a disclosed portable electronic communication device includes a battery having a voltage rating greater than a predefined maximum safe voltage for operation of the portable electronic device in a hazardous environment and configured to supply electrical power to functional elements of the portable electronic communication device and a voltage limiting circuit. The battery may be a multi-cell battery having a combined voltage rating greater than the predefined maximum safe voltage. The voltage limiting circuit includes a first metal-oxide-semiconductor field-effect transistor (MOSFET) switch of a first voltage restriction stage of the voltage limiting circuit in a battery supply line between the battery and the functional elements of the portable electronic communication device, the first MOSFET switch including a first forward biased body diode configured to reduce a voltage delivered by a battery across the battery supply line by a first fixed amount while the first MOSFET switch is deactivated, and a first comparator circuit of the first voltage restriction stage communicatively coupled to the first MOSFET switch. The first comparator may be configured to determine whether the voltage delivered by the battery exceeds a predefined maximum safe voltage for operation of a portable electronic device in a hazardous environment, to output a first control signal to deactivate the first MOSFET switch responsive to a determination that the voltage delivered by the battery exceeds the predefined maximum safe voltage, and to output a second control signal to activate the first MOSFET switch responsive to a determination that the voltage delivered by the battery does not exceed the predefined maximum safe voltage.

In various embodiments, the first comparator circuit may be further configured to determine, subsequent to outputting the first control signal, that the voltage delivered by the battery no longer exceeds the predefined maximum safe voltage for operation of the portable electronic device in the hazardous environment and to output the second control signal to activate the first MOSFET switch responsive to the determination that the voltage delivered by the battery no longer exceeds the predefined maximum safe voltage.

In various embodiments, the voltage limiting circuit further may further include one or more additional voltage restriction stages, each of which includes a respective MOSFET switch of the additional voltage restriction stage, the respective MOSFET switch including a respective forward biased body diode configured to reduce the voltage delivered to the additional voltage restriction stage across the supply line by a respective fixed amount while the respective MOSFET switch is deactivated, and a respective comparator circuit of the additional voltage restriction stage communicatively coupled to the respective MOSFET switch. The respective comparator circuit may be configured to determine whether the voltage delivered to the additional voltage restriction stage exceeds the predefined maximum safe voltage, to output a respective deactivation control signal to deactivate the respective MOSFET switch responsive to a determination that the voltage delivered to the additional voltage restriction stage exceeds the predefined maximum safe voltage, and to output a respective activation control signal to activate the respective MOSFET switch responsive to a determination that the voltage delivered to the additional voltage restriction stage does not exceed the predefined maximum safe voltage.

In various embodiments, the portable electronic communication device may further include a power management device through which electrical power supplied by the battery and delivered to the voltage limiting circuit across the supply line is delivered to the functional elements of the portable electronic communication device at a voltage that does not exceed the predefined maximum safe voltage.

In various embodiments, the portable electronic communication device may further include an isolation circuit between the battery and the functional elements of the portable electronic communication device in the supply line, the isolation circuit configured to prevent delivery of electrical power to the functional elements of the portable electronic communication device at a voltage that exceeds the predefined maximum safe voltage. The voltage limiting circuit may be an element of the isolation circuit.

As previously noted, battery packs and battery cells thereof are growing in terms of capacity and increased voltage ratings due to the introduction of improved battery chemistries and a demand for higher power and capacity. These increasing voltage ratings may pose a risk for products intended for use in hazardous locations (e.g., so-called "HAZLOC products") and subject to UL div 1 and ATEX standards for operation in hazardous locations. In addition, the increase in the voltage ratings means that the maximum capacitance usable for a radio, for example, is decreasing at a time when radio designs are becoming getting more complex. For example, radio designers are continuing to add functional features and connectivity features in terms of application processing, baseband processing, LTE, WiFi, Touch etc. The maximum allowable capacitance listed in the HAZLOC standards for portable electronic devices with a battery rated at 8.4V is 380 uF. For portable electronic devices with a battery rated at 8.8V, the maximum allowable capacitance is significantly degraded to only 240 uF.

An increase in battery voltage ratings from 8.4V to 8.8V or, in the future, 9V, 10V, or more, may in general improve the battery capacity, e.g., the peak power handling capability, but this higher voltage rating is not compatible with HAZLOC equipment protection standards, which specify 8.4V as a maximum voltage rating limit for portable electronic devices operating in hazardous locations. However, clamping the voltage on these new cells reduces the usable battery capacity significantly.

In dual-cell battery packs, the voltage ratings for the two cells have been increasing from a maximum voltage rating of 4.2V (resulting in an overall voltage rating of 8.4V for the battery pack) to a maximum voltage rating of 4.5V (resulting in an overall voltage rating of 9V for the battery pack), with a corresponding increase in energy density. In the future, voltage ratings for individual battery cells may reach 4.8V per cell (resulting in an overall voltage rating of 9.6V for a dual-cell battery pack).

As described herein, methods and apparatus for implementing on-demand clamping of battery output voltage for products, such as radios, in hazardous locations may include a MOSFET-based dynamic voltage limiting circuit that meets HAZLOC equipment protection standards while benefiting from having higher voltage rated batteries most of the time. In at least some embodiments, the methods and apparatus may include a method to enable a voltage restriction device that limits the battery voltage to be less than a predefined maximum safe voltage for products in hazardous locations only when the battery output voltage exceeds the predefined maximum safe voltage. The voltage restriction device may be or include one or multiple voltage limiting circuit stages to allow the voltage in the supply line to drop until the predefined maximum safe voltage is reached. This approach may allow higher voltage rated cells to be used with HAZLOC products without violating the HAZLOC equipment protection standards. After the battery discharges for some period of time (e.g., due to normal operation of the radio) and the voltage output by the battery falls below the predefined maximum safe voltage, the method may include releasing or disabling the voltage restriction device and allowing the battery to supply electrical power directly to the radio with minimal loss. The MOSFET-based dynamic voltage limiting circuits described herein may include a fast reacting switch that can react when the battery output voltage exceeds the predefined maximum safe voltage to enable the voltage restriction device and also to disable the voltage restriction device after the battery output voltage drops below the predefined maximum safe voltage without software intervention, which is not allowed by the HAZLOC equipment protection standards body.

Referring now to FIG. 1, there is provided a block diagram illustrating selected elements of an example portable electronic communication device 100 configured for operation in a hazardous environment, in accordance with some embodiments. The portable electronic communication device 100 may be or include, for example, a land mobile radio designed for operation in a hazardous environment or in a location subject to HAZLOC equipment protection standards. Circuitry for implementing the functionality of the land mobile radio is shown in FIG. 1 as radio module 140. In some embodiments, radio module 140 may include a microcontroller and analog circuitry that collectively implement land mobile radio functionality. In the illustrated embodiment, electrical power is supplied to the portable electronic communication device 100 by a battery pack 110. In some embodiments, battery pack 110 may include a multi-cell battery whose combined voltage rating exceeds a predefined maximum safe voltage for the operation of portable electronic communication device 100 in a hazardous environment. In the illustrated embodiment, portable electronic communication device 100 includes an isolation circuit 120 deployed at the power supply input of the portable electronic communication device 100 between the battery pack 110 and the remaining elements of the portable electronic communication device 100, such as radio module 140 and power management integrated circuit (PMIC) 130.

In other embodiments, the isolation circuit 120 may be an element of battery pack 110, such as a circuit deployed at the output of the battery pack 110 rather than at the power supply input of the portable electronic communication device 100.

In at least some embodiments, the isolation circuit 120 may be configured to prevent the delivery of electrical power supplied by battery pack 110, shown as electrical power 115, to other elements of the portable electronic communication device 100 at a voltage that exceeds the predefined maximum safe voltage for the operation of portable electronic communication device 100 in a hazardous environment. More specifically, the isolation circuit 120 may not allow electrical power to be supplied to the remaining elements of the portable electronic communication device 100, such as radio module 140 and PMIC 130, nor the land mobile radio to be powered up, until and unless the voltage at the output of the isolation circuit 120, shown as electrical power 125, is below the predefined maximum safe voltage. As illustrated in FIG. 1, in at least some embodiments, the isolation circuit 120 may include a HAZLOC clamp on-demand circuit voltage limiting circuit 124 configured to reduce the battery output voltage by an amount sufficient to ensure that the voltage at which power is delivered to radio module 140 and PMIC 130 does not exceed the predefined maximum safe voltage. As described in more detail below, in some embodiments, the HAZLOC clamp on-demand circuit voltage limiting circuit 124 may be a multi-stage on-demand voltage limiting circuit that provides the redundancy required to meet HAZLOC equipment protection standards. In some embodiments, isolation circuit 120 may also include other power-related elements including, as in the illustrated example, a leakage controller 122.

In some embodiments, PMIC 130 may be a solid state device configured to further condition the electrical power 125 delivered by isolation circuit 120, such as by controlling the flow and direction of electrical power, or by performing voltage scaling, power sequencing, power source selection for various components, and/or other power management functions, and to deliver the further conditioned power to various functional elements of portable electronic communication device 100, such as radio module 140, as electrical power 135. In the illustrated example, electrical power for which the voltage is not restricted and that may potentially be delivered at a voltage exceeding the predefined maximum safe voltage is shown with solid arrows. For example, the voltage at which the electrical power shown as 115 is delivered to the isolation circuit 120 may be as high as the maximum voltage rating for the battery pack 110. Conversely, electrical power for which the voltage is restricted such that it does not exceed the predefined maximum safe voltage is shown with dashed arrows. For example, the voltage at which the electrical power shown as 125 is delivered to the PMIC 130 and the voltage at which the electrical power shown as 135 is delivered to the radio module 140 may, when necessary, be reduced by the HAZLOC clamp-on-demand voltage limiting circuit 124 to voltages below the predefined maximum safe voltage.

Figure 2:
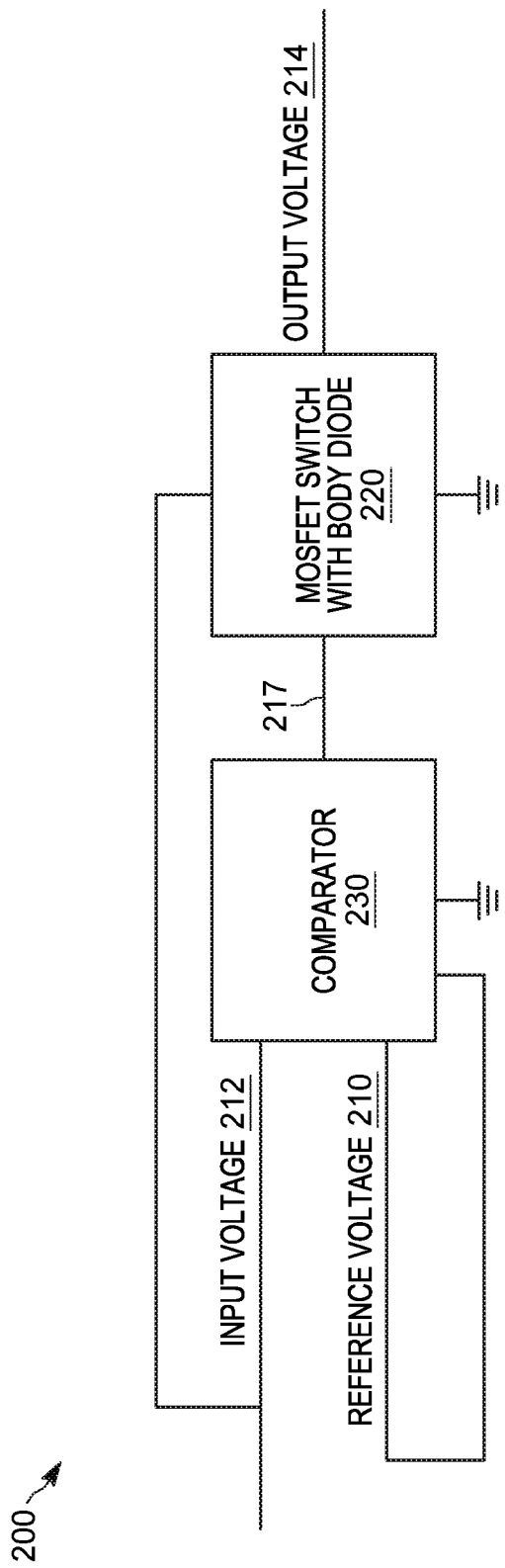
FIG. 2 is a block diagram illustrating selected elements of a HAZLOC clamp-on-demand voltage limiting circuit, in accordance with some embodiments.

FIG. 2 is a block diagram illustrating selected elements of a HAZLOC clamp-on-demand voltage limiting circuit 200, in accordance with some embodiments. In some embodiments, the HAZLOC clamp-on-demand voltage limiting circuit 200 illustrated in FIG. 2 may represent a single stage of a multi-stage on-demand voltage limiting circuit that provides the redundancy required to meet HAZLOC equipment protection standards for a portable electronic device in which it is deployed, such as HAZLOC clamp-on-demand circuit 124 illustrated in in FIG. 1. For example, HAZLOC equipment protection standards may require that a voltage limiting circuit include triple redundancy such that the voltage limiting circuit will be able to reduce a battery voltage supplied at its input by an amount sufficient to drop the voltage on the supply line below the predefined maximum safe voltage even if two redundant circuits fail to do so due to any of a variety of error conditions or faults.

In the illustrated embodiment, the HAZLOC clamp-on-demand voltage limiting circuit 200 includes a MOSFET switch 220 and a comparator 230. In at least some embodiments, the MOSFET switch 220 includes a body diode in forward bias from its drain to its source (not shown in FIG. 2). In at least some embodiments, the comparator 230 may be configured to compare the voltage at its input, shown as input voltage 212, with a reference voltage 210 at its inverting input to determine whether the input voltage 212 is greater than or less than the reference voltage 210. The reference voltage may be similar to, or derived from, a predefined maximum safe voltage for the operation of a portable electronic device containing the HAZLOC clamp-on-demand voltage limiting circuit 200 in a hazardous environment. In some embodiments, the comparator 230 may include or generate the internal reference voltage 210 to be provided at its inverting input.

In the illustrated embodiment, signal 217 represents a control signal output by the comparator 230 to control the MOSFET switch 220. For example, if the input voltage 212 is greater than the reference voltage 210, the MOSFET switch 220 will be deactivated. In this case, the control signal output 217 of the comparator 230 may be provided to the MOSFET switch 220 as a first control signal, e.g., a deactivation control signal, to deactivate the MOSFET switch 220. In this case, the body diode of MOSFET switch 220 may reduce the input voltage 212 by a fixed voltage drop amount such that the voltage at the output of the HAZLOC clamp-on-demand voltage limiting circuit 200, shown as the output voltage 214, no longer exceeds the predefined maximum safe voltage. Once the output voltage 214 drops below the predefined maximum safe voltage, electrical power may be supplied to various elements of the portable electronic device in which it is deployed. In some embodiments, signal 217 may be a digital control signal.

Conversely, if the input voltage 212 is less than the reference voltage 210, the MOSFET switch 220 will be activated. In this case, the control signal output 217 of the comparator 230 may be provided to the MOSFET switch 220 as a second control signal, e.g., an activation control signal, to activate the MOSFET switch 220. In this case, the body diode of the MOSFET switch 220 is bypassed and does not reduce the input voltage 212 by the fixed voltage drop amount. Note that there may be a very small voltage drop from input voltage 212 to output voltage 214 through the voltage limiting circuit 200 even when the MOSFET switch 220 is activated. However, this voltage drop may be much too small to drop the voltage below the predefined maximum safe voltage.

In at least some embodiments, after operating for some period of time with the MOSFET switch 220 deactivated and a fixed voltage drop being provided by the body diode of the MOSFET switch 220, the battery may be sufficiently discharged (e.g., due to normal operation of the radio to transmit, receive, run software applications, etc.) to drop the battery output voltage below the predefined maximum safe voltage. At this point, it may no longer be necessary for the body diode to provide the fixed voltage drop. In this case, the comparator 230 may determine that the input voltage 212 is no longer greater than the reference voltage 210 and may provide control signal output 217 to the MOSFET switch 220 as an activation control signal to activate the MOSFET switch 220 and bypass the body diode.

In at least some embodiments, if the MOSFET switch 220 is deactivated by a deactivation control signal provided by the comparator 230, but the voltage limiting circuit 200 fails to reduce the input voltage 212 by an amount sufficient to drop the output voltage 214 below the predefined maximum safe voltage, the output voltage 214 may be provided as an input voltage 212 to a second voltage limiting circuit, such as a second stage of a multi-stage on-demand voltage limiting circuit that provides the redundancy required to meet HAZLOC equipment protection standards. For example, the voltage limiting circuit 200 may fail to reduce the input voltage 212 by an amount sufficient to drop the output voltage 214 below the predefined maximum safe voltage when the input voltage 212 is higher than the voltage limiting circuit 200 was designed to handle, when the body diode of the MOSFET 220 fails to provide an expected amount of voltage drop, or when the voltage limiting circuit 200 experiences another error condition or fault of a type that prevents it from reducing the input voltage 212 by an amount sufficient to drop the output voltage 214 below the predefined maximum safe voltage. In this case, the output voltage 214 may be reduced, or further reduced, by one or more additional stages of the multi-stage on-demand voltage limiting circuit. For example, a second stage voltage limiting circuit of the multi-stage on-demand voltage limiting circuit may be similar to voltage limiting circuit 200 illustrated in FIG. 2 and may include a second instance of comparator 230 and a second instance of MOSFET switch 220 configured as shown in FIG. 2 and described above.

If the second instance of MOSFET switch 220 is deactivated by a deactivation control signal provided by the second instance of comparator 230, but the second stage voltage limiting circuit fails to reduce its input voltage, corresponding to output voltage 214, by an amount sufficient to drop the output voltage of the second stage voltage limiting circuit below the predefined maximum safe voltage, the output voltage of the second stage voltage limiting circuit may be provided as an input voltage to a third stage voltage limiting circuit of the multi-stage on-demand voltage limiting circuit. In this example, it may be assumed that each individual voltage limiting circuit of the multi-stage on-demand voltage limiting circuit is, absent an error condition or fault, capable of reducing its input voltage by an amount sufficient to drop its output voltage below the predefined maximum safe voltage. Therefore, as few as three voltage limiting circuit stages may provide the required triple redundancy. In other embodiments, the techniques described herein may be extended to handle higher battery voltage outputs by including additional voltage limiting stages that collectively provide a higher voltage drop than any single one of the stages. In such embodiments, the voltage limiting circuit may include at least two stages more than is necessary to drop an input voltage to an output voltage below an applicable predefined maximum safe voltage.

Figure 3:
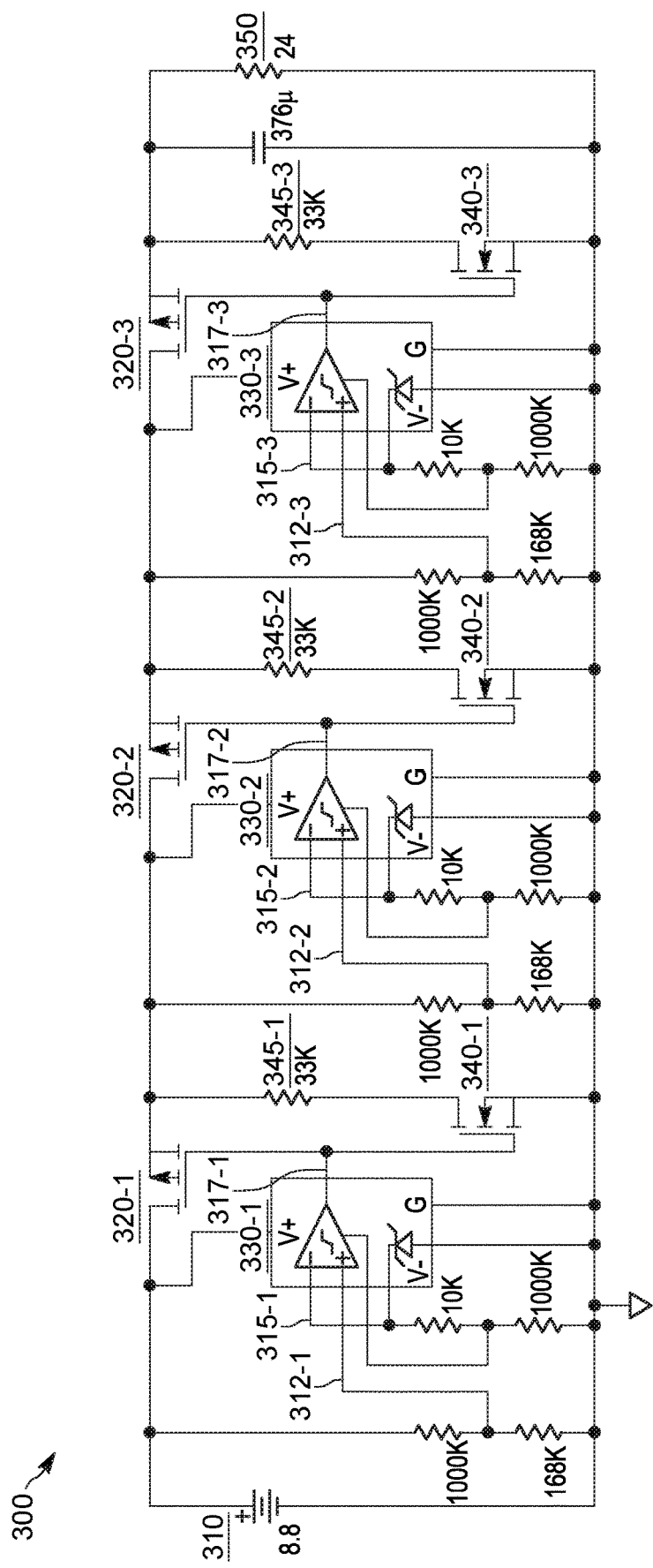
FIG. 3 is a circuit diagram illustrating selected elements of a multi-stage HAZLOC clamp-on-demand voltage limiting circuit, in accordance with some embodiments.

FIG. 3 is a circuit diagram illustrating selected elements of a multi-stage HAZLOC clamp-on-demand voltage limiting circuit 300, in accordance with some embodiments. More specifically, multi-stage HAZLOC clamp-on-demand voltage limiting circuit 300 includes three voltage restriction circuit stages, each of which is configured to reduce a battery pack output voltage at its input, shown as input voltage 312, by a fixed amount if and only if the input voltage 312 exceeds a predefined maximum safe voltage for the operation of a portable electronic device containing the multi-stage HAZLOC clamp-on-demand voltage limiting circuit 300 in a hazardous environment. In at least some embodiments, the multi-stage HAZLOC clamp-on-demand voltage limiting circuit 300 may be deployed in a supply line between a battery pack and a portable electronic device that is configured to be powered by the battery pack when the battery pack output voltage does not exceed the predefined maximum safe voltage. As illustrated in FIG. 3, in at least some embodiments, the voltage limiting circuits described herein, and each of multiple stages thereof, may use only discrete passive type devices to control the voltage supplied to the portable electronic device, as required by HAZLOC equipment protection standards. Unlike with some existing equipment protection approaches, no active devices, complex integrated circuits, or software mechanisms are used to restrict the voltage, in accordance with HAZLOC equipment protection standards. For example, the HAZLOC equipment protection standard do not allow a regulator, a charge pump, a software intervention, or programmable logic, among other approaches, to be used to control and/or limit the voltage at which electrical power is supplied to the portable electronic device. Instead, a hardware solution is required.

In the illustrated embodiment, a respective voltage restriction circuit in each of the three stages of voltage limiting circuit 300 includes a respective MOSFET switch 320 and a respective comparator 330. For example, a first stage voltage restriction circuit includes a MOSFET switch 320-1 and a comparator 330-1, a second stage voltage restriction circuit includes a MOSFET switch 320-2 and a comparator 330-2, and a third stage voltage restriction circuit includes a MOSFET switch 320-3 and a comparator 330-3. Each of the MOSFET switches 320 includes a respective body diode in forward bias from its drain to its source, as described above (not shown in FIG. 3). Each of the comparators 330 includes a reference voltage 315 that is fed into the inverting input of the comparator 330. The reference voltage may be similar to, or derived from, the predefined maximum safe voltage. In some embodiments, the reference voltage may be slightly lower than the predefined maximum safe voltage. In such embodiments, the resistor ladder shown in each voltage restriction circuit may step the respective input voltage down by a similar amount prior to providing the input voltage to the comparator 330. In the illustrated embodiment, a respective control signal output by the comparator 330 in each of the three stages, shown as control signals 317-1, 317-2, and 317-3, may control the respective MOSFET switch 220 in the stage. In some embodiments, the control signals 317 may be digital control signals.

As described above in reference to FIG. 2, each of the comparators 330 is configured to compare its input voltage 312 with the reference voltage 315 at its inverting input to determine whether the input voltage 312 is greater than or less than the reference voltage 315. If the input voltage 312 is greater than the reference voltage 315, the corresponding MOSFET switch 320 will be deactivated by a deactivation control signal 317 and the body diode of the MOSFET switch 320 will provide a fixed voltage drop. However, if the input voltage 312 is less than the reference voltage 315, the corresponding MOSFET switch 320 will be activated by an activation control signal 317 and its body diode bypassed.

For example, if the input voltage 312-1 is greater than the reference voltage 315-1, the MOSFET switch 320-1 will be deactivated. In this case, the control signal output 317-1 of the comparator 330-1 may be provided to the MOSFET switch 320-1 as a first control signal, e.g., a deactivation control signal, to deactivate the MOSFET switch 320-1. In this case, the body diode of MOSFET switch 320-1 may reduce the input voltage 312-1 by a fixed voltage drop amount such that the voltage at the output of the first stage voltage restriction circuit does not exceed the predefined maximum safe voltage.

Conversely, if the input voltage 312-1 is less than the reference voltage 315-1, the MOSFET switch 320-1 will be activated. In this case, the control signal output 317 of the comparator 330-1 may be provided to the MOSFET switch 320-1 as a second control signal, e.g., an activation control signal, to activate the MOSFET switch 320-1. In this case, the body diode of the MOSFET switch 320-1 is bypassed and does not reduce the input voltage 312-1 by the fixed voltage drop amount. Note that there may be a very small voltage drop from input voltage 312-1 to the output voltage of the first stage voltage limiting circuit even when the MOSFET switch 320-1 is activated. However, this voltage drop may be much too small to drop the output voltage of the first stage voltage limiting circuit below the predefined maximum safe voltage.

In the illustrated embodiment, the input voltage 312-1 of the first voltage limiting circuit stage may be approximately equal to the battery pack output voltage 310. The voltage at the input of the second voltage limiting circuit stage, shown as input voltage 312-2, may be approximately equal to the voltage at the output of the first voltage limiting circuit stage. Similarly, the voltage at the input of the third voltage limiting circuit stage, shown as input voltage 312-3, may be approximately equal to the voltage at the output of the second voltage limiting circuit stage.

In one example, the battery pack output voltage 310 may be approximately 8.8V and the predefined maximum safe voltage, and each of the reference voltages 315, may be approximately 8.4V. In this example, absent a fault at the first voltage limiting circuit stage, since the battery pack output voltage 310, and thus the input voltage 312-1 of the first voltage limiting circuit stage, exceeds the reference voltage 315-1, the MOSFET switch 320-1 will be deactivated by deactivation control signal 317-1 and the body diode of MOSFET switch 320-1 will reduce the battery pack output voltage 310 by an amount sufficient to drop the battery pack output voltage below the predefined maximum safe voltage of 8.4V, such as by 0.4V or slightly more. In this case, the input voltage 312-2 at the second voltage limiting circuit stage will be below the predefined maximum safe voltage of 8.4V, the MOSFET switch 320-2 will be activated, and the body diode of MOSFET switch 320-2 will be bypassed such that no additional voltage drop is applied by the body diode of MOSFET switch 320-2 in the second voltage limiting circuit stage. Similarly, since the input voltage 312-3 at the third voltage limiting circuit stage will be below the predefined maximum safe voltage of 8.4V, the MOSFET switch 320-3 will be activated, and the body diode of MOSFET switch 320-3 will be bypassed such that no additional voltage drop is applied by the body diode of MOSFET switch 320-3 in the third voltage limiting circuit stage.

In another example in which the maximum battery pack output voltage is approximately 8.8V and the predefined maximum safe voltage is approximately 8.4V, the battery pack output voltage 310, and thus the input voltage 312-1 of the first voltage limiting circuit stage, may exceed the reference voltage 315-1. In this example, absent a fault at the first voltage limiting circuit stage, the MOSFET switch 320-1 will be deactivated by a deactivation control signal 317 and the body diode of MOSFET switch 320-1 will reduce the battery pack output voltage 310 by an amount sufficient to drop the battery pack output voltage below the predefined maximum safe voltage of 8.4V, such as by 0.4V or slightly more. However, if there is an error condition or fault at the first voltage limiting circuit stage, the battery pack output voltage 310 might not be reduced at all or the battery pack output voltage 310 might not be reduced by an amount sufficient to drop the output voltage of the first voltage limiting circuit stage below the predefined maximum safe voltage of 8.4V by the first voltage limiting circuit stage. In either case, the voltage at the output of the first voltage limiting circuit stage and the input voltage 312-2 of the second voltage limiting circuit stage may still exceed the reference voltage of 8.4V. In this case, absent a fault at the second voltage limiting circuit stage, the MOSFET switch 320-2 will be deactivated by a deactivation control signal 317-2 and the body diode of MOSFET switch 320-2 will reduce the input voltage 312-2 by an amount sufficient to drop the output voltage of the second voltage limiting circuit stage below the predefined maximum safe voltage of 8.4V. In this case, the voltage at the input to the third voltage limiting circuit stage will be less than the predefined maximum safe voltage of 8.4V, the MOSFET switch 320-3 will be activated by an activation control signal 317-3, and the body diode of MOSFET switch 320-3 will be bypassed such that no additional voltage drop is applied by the body diode of MOSFET switch 320-2 in the third voltage limiting circuit stage. However, if there is a fault in the second voltage limiting circuit stage, such that the input voltage 312-2 of the second voltage stage might not be reduced at all or the input voltage 312-2 might not be reduced by an amount sufficient to drop the output voltage of the second voltage limiting circuit stage below the predefined maximum safe voltage of 8.4V by the second voltage limiting circuit stage. In either case, the voltage at the output of the second voltage limiting circuit stage and the input voltage 312-3 of the third voltage limiting circuit stage may still exceed the reference voltage of 8.4V. Therefore, the MOSFET switch 320-3 will be deactivated and the body diode of MOSFET switch 320-3 will reduce the input voltage 312-3 by an amount sufficient to reduce the input voltage 312-3 below the predefined maximum safe voltage of 8.4V.

In the illustrated embodiment, optional resistors in the respective voltage restriction circuit in each of the three stages, shown as resistors 345, may provide a current path to ground to allow the body diodes of each of the MOSFET switches 320, respectively, to apply a voltage drop across the supply line. In some embodiments, optional switches in the respective voltage restriction circuit in each of the three stages, shown as switches 340, may allow the comparators 330 to be powered on even when the battery voltage or the voltage across the supply line at or between any of the stages of the voltage limiting circuit is greater than 8.4 V. In the illustrated example, resistor 350 may represent the load on the battery pack, such as a radio standby current.

In some embodiments, the MOSFET switches used in each of the voltage limiting stages of a multi-stage HAZLOC clamp-on-demand voltage limiting circuit may be selected based on the expected maximum battery pack output voltage (e.g., a maximum voltage rating for the battery pack) and the predefined maximum safe voltage for a portable electronic device into which the multi-stage HAZLOC clamp-on-demand voltage limiting circuit is to be deployed such that the body diode reduces the battery pack output voltage by an amount sufficient to drop the voltage in the supply line below the predefined maximum safe voltage. For example, in a portable electronic device powered by a battery pack with a maximum voltage rating of 8.8V and a predefined maximum safe voltage of 8.4V, a MOSFET switch having a body diode configured to drop the voltage in the supply line by approximately 0.4V, or slightly more, may be selected. In embodiments in which a portable electronic device is powered by a battery pack with a higher maximum voltage rating, a MOSFET with a body diode configured to drop the voltage by a larger amount may be selected. For example, in a portable electronic device powered by a battery pack with a maximum voltage rating of 9.6V and a predefined maximum safe voltage of 8.4V, a MOSFET switch having a body diode configured to drop the voltage in the supply line by approximately 1.2V, or slightly more, may be selected for each voltage limiting circuit stage. In this example, a voltage limiting circuit including three stages may be sufficient to drop the battery pack voltage below the predefined maximum safe voltage of 8.4V with triple redundancy. In other embodiments in which a portable electronic device is powered by a battery pack with a higher maximum voltage rating, such as 9.6V, additional voltage limiting circuit stages, each including a MOSFET with a body diode configured to drop the input voltage by 0.4V may be added to ensure that the overall voltage drop of the voltage limiting circuit will be sufficient to drop the voltage in the supply line below the predefined maximum safe voltage of 8.4V even if two of the voltage limiting circuit stages fail to drop the voltage by the expected amount. For example, in a portable electronic device powered by a battery pack with a maximum voltage rating of 9.6V, a voltage limiting circuit may include five voltage limiting circuit stages, each of which includes a MOSFET switch with a body diode configured to drop the input voltage by 0.4V, or slightly more. In this example, when the input voltage is 9.6V, even if two of the five voltage limiting circuit stages fail to drop the input voltage by the expected 0.4V, the other three voltage limiting circuit stages may, collectively, drop the voltage by 1.2V, or slightly more, which is sufficient to drop the voltage below the predefined maximum safe voltage of 8.4V.

Figure 4:
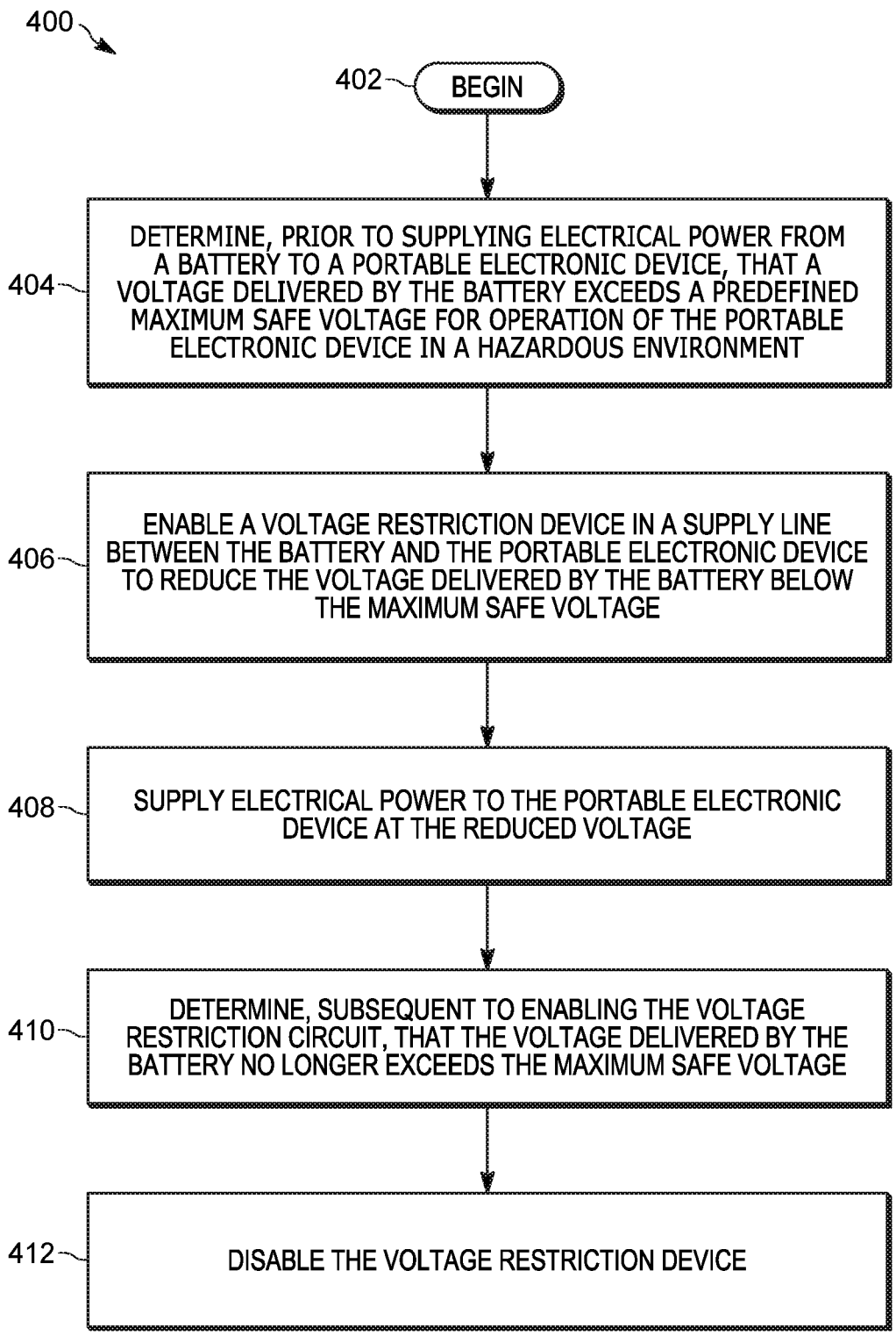
FIG. 4 is a flowchart illustrating selected elements of an example method for dynamically limiting battery voltage in a hazardous environment, in accordance with some embodiments.

Referring now to FIG. 4, there is provided a flowchart illustrating selected elements of an example method 400 for dynamically limiting battery voltage in a hazardous environment, in accordance with some embodiments. While a particular order of operations is indicated in FIG. 4 for illustrative purposes, the timing and ordering of such operations may vary where appropriate without negating the purpose and advantages of the examples set forth in detail throughout the remainder of this disclosure.

In the example embodiment illustrated in FIG. 4, method 400 begins with block 402 and continues with block 404, with determining, prior to supplying electrical power from a battery to a portable electronic device, that a voltage delivered by the battery exceeds a predefined maximum safe voltage for operation of the portable electronic device in a hazardous environment. For example, a comparator may, e.g., continuously, compare the battery output voltage to a reference voltage corresponding to, or derived from the predefined maximum safe voltage to determine whether the battery output voltage exceeds the predefined maximum safe voltage.

At 406, method 400 includes enabling a voltage restriction device in a supply line between the battery and the portable electronic device to reduce the voltage delivered by the battery below the maximum safe voltage. For example, in response to the comparator determining that the battery output voltage exceeds the predefined maximum safe voltage, the comparator may provide a deactivation control signal to a MOSFET switch that includes a forward biased body diode to deactivate the MOSFET switch. In this case, the forward biased body diode reduces the battery voltage across the supply line by a fixed amount. In some embodiments, the deactivation control signal may be a digital control signal.

At 408, the method includes supplying electrical power to the portable electronic device at the reduced voltage.

At 410, method 400 includes determining, subsequent to enabling the voltage restriction device, that the voltage delivered by the battery no longer exceeds the maximum safe voltage. As noted above, the comparator may, e.g., continuously, compare the battery output voltage to a reference voltage corresponding to, or derived from, the predefined maximum safe voltage to determine whether the battery output voltage exceeds the predefined maximum safe voltage. After operating the portable electronic device for some period of time using electrical power supplied at a voltage that has been reduced from the battery output voltage by the voltage restriction device, the battery may be sufficiently discharged to drop the battery output voltage below the predefined maximum safe voltage. At this point, it may no longer be necessary for the voltage restriction device to provide a voltage drop.

At 412, the method includes disabling the voltage restriction device. Disabling the voltage restriction device may include, for example, the comparator providing an activation control signal to the MOSFET switch to activate the MOSFET switch such that the body diode is bypassed while electrical power is supplied to the portable electronic device at a voltage that does not exceed the predefined maximum safe voltage. In some embodiments, the activation control signal may be a digital control signal.

Figure 5:
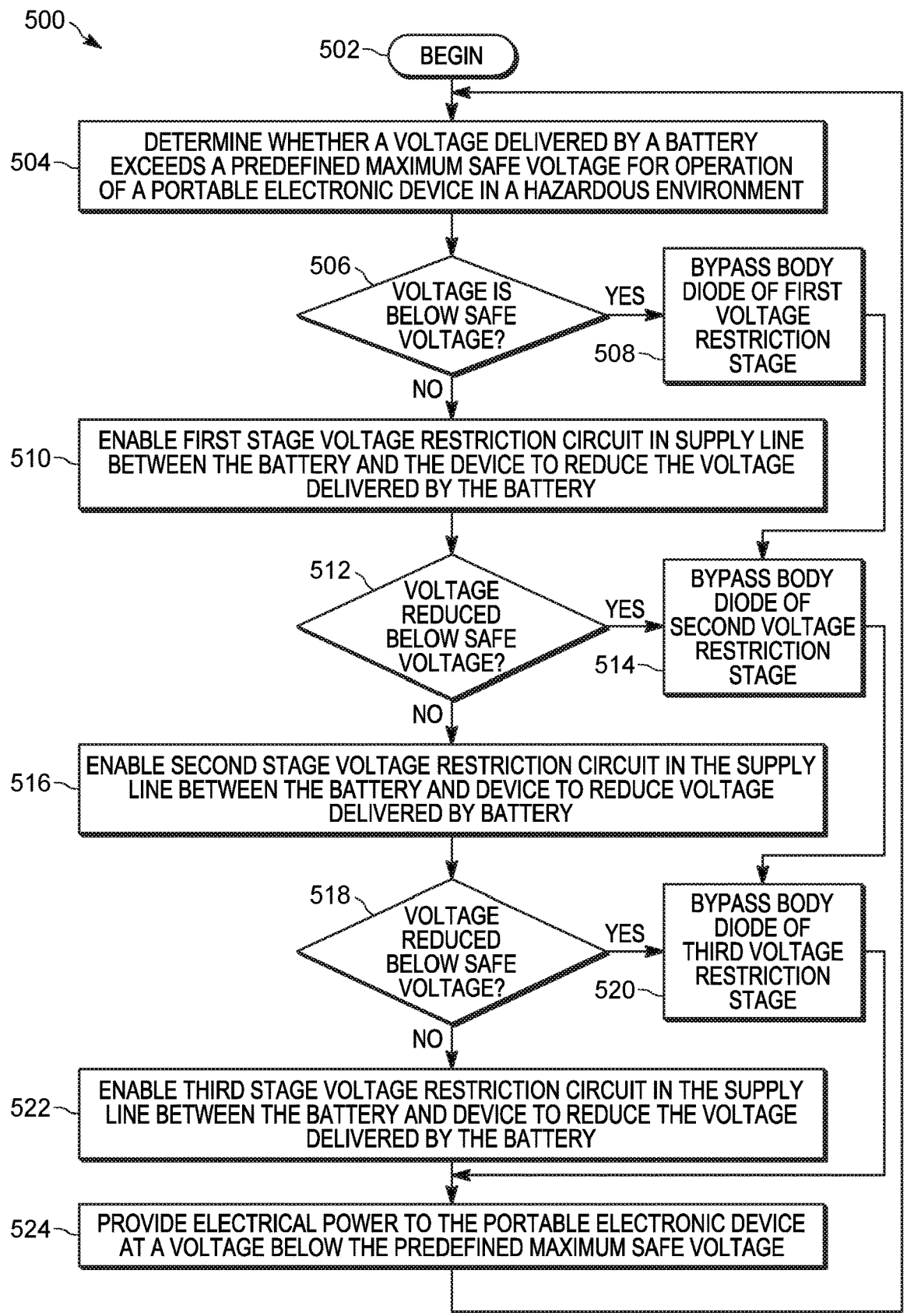
FIG. 5 is a flowchart illustrating selected elements of an example method for limiting battery voltage in a hazardous environment using a multi-stage HAZLOC clamp-on-demand voltage limiting circuit, in accordance with some embodiments.

Referring now to FIG. 5, there is provided a flowchart illustrating selected elements of an example method 500 for limiting battery voltage in a hazardous environment using a multi-stage HAZLOC clamp-on-demand voltage limiting circuit, in accordance with some embodiments. While a particular order of operations is indicated in FIG. 5 for illustrative purposes, the timing and ordering of such operations may vary where appropriate without negating the purpose and advantages of the examples set forth in detail throughout the remainder of this disclosure.

In the example embodiment illustrated in FIG. 5, method 500 begins with block 502 and continues with block 504, with determining whether a voltage delivered by a battery exceeds a predefined maximum safe voltage for operation of a portable electronic device in a hazardous environment. For example, a comparator in a first stage voltage restriction circuit (e.g., a first stage of the multi-stage HAZLOC clamp-on-demand voltage limiting circuit) may continuously compare the battery output voltage to a reference voltage corresponding to, or derived from, the predefined maximum safe voltage to determine whether the battery output voltage exceeds the predefined maximum safe voltage.

If, at block 506, it is determined that the battery voltage is below the predefined maximum safe voltage, the method continues at 508. Otherwise, the method proceeds to 510. At 508, the method includes bypassing a body diode of the first stage voltage restriction circuit (e.g., a first stage of the multi-stage HAZLOC clamp-on-demand voltage limiting circuit). For example, in response to determining that the battery voltage is below the predefined maximum safe voltage, the comparator in the first stage voltage restriction circuit may provide an activation control signal to a MOSFET switch in the first stage voltage restriction circuit that includes a forward biased body diode to activate the MOSFET switch such that the body diode is bypassed. In this case, method 500 continues to 514, then to 520, and finally to 524 before repeating. In some embodiments, the activation control signal may be a digital control signal.

At 510, the method includes enabling a first stage voltage restriction circuit in a supply line between the battery and the portable electronic device to reduce the voltage delivered by the battery. For example, in response to determining that the battery output voltage exceeds the predefined maximum safe voltage, the comparator in the first stage voltage restriction circuit may provide a deactivation control signal to the MOSFET switch to deactivate the MOSFET switch. In this case, the forward biased body diode reduces the battery voltage across the supply line by a fixed amount. In some embodiments, the deactivation control signal may be a digital control signal.

If, at block 512, it is determined that the battery voltage is, or has been reduced to be, below the predefined maximum safe voltage, the method continues at 514. Otherwise, the method proceeds to 516. For example, if there is an error condition or fault at the first stage voltage limiting circuit, the battery output voltage might not be reduced at all or the battery output voltage might not be reduced by an amount sufficient to drop the battery output voltage below the predefined maximum safe voltage.

At 514, the method includes bypassing a body diode of a second voltage restriction circuit (e.g., a second stage of a multi-stage HAZLOC clamp-on-demand voltage limiting circuit). For example, in response to determining that the battery voltage is, or has been reduced to be, below the predefined maximum safe voltage, the comparator in the second stage voltage restriction circuit may provide an activation control signal to a MOSFET switch in the second stage voltage restriction circuit that includes a forward biased body diode to activate the MOSFET switch such that the body diode is bypassed. In this case, method 500 continues to 520 and then to 524 before repeating. In some embodiments, the activation control signal may be a digital control signal.

At 516, the method includes enabling a second stage voltage restriction circuit in the supply line between the battery and the portable electronic device to reduce, or further reduce, the voltage delivered by the battery. For example, in response to the comparator in the second stage voltage restriction circuit determining that the battery output voltage exceeds the predefined maximum safe voltage, the comparator may provide a deactivation control signal to the MOSFET switch in the second stage voltage restriction circuit to deactivate the MOSFET switch. In this case, the forward biased body diode reduces the battery voltage across the supply line by a fixed amount. In some embodiments, the deactivation control signal may be a digital control signal.

If, at block 518, it is determined that the battery voltage has yet to be reduced below the predefined maximum safe voltage, the method continues at 522. Otherwise, the method proceeds to 520. For example, if there is an error condition or fault at the second stage voltage limiting circuit, the battery output voltage might not be reduced at all or the battery output voltage might not be reduced by an amount sufficient to drop the battery output voltage below the predefined maximum safe voltage.

At 520, the method includes bypassing a body diode of a third voltage restriction circuit (e.g., a third stage of a multi-stage HAZLOC clamp-on-demand voltage limiting circuit). For example, in response to determining that the battery voltage is, or has been reduced to be, below the predefined maximum safe voltage, the comparator in the third stage voltage restriction circuit may provide an activation control signal to a MOSFET switch in the third stage voltage restriction circuit that includes a forward biased body diode to activate the MOSFET switch such that the body diode is bypassed. In this case, method 500 continues to 524 before repeating. In some embodiments, the activation control signal may be a digital control signal.

At 522, the method includes enabling the third stage voltage restriction circuit in the supply line between the battery and the portable electronic device to reduce, or further reduce, the voltage delivered by the battery. For example, in response to the comparator determining that the battery output voltage exceeds the predefined maximum safe voltage, the comparator may provide a deactivation control signal to a MOSFET switch in the third stage voltage restriction circuit that includes a forward biased body diode to deactivate the MOSFET switch. In this case, the forward biased body diode reduces the battery voltage across the supply line by a fixed amount. In some embodiments, the deactivation control signal may be a digital control signal.

At 524, the method includes providing electrical power to the portable electronic at a voltage that is below the predefined maximum safe voltage. Note that, in the illustrated embodiment, it may be assumed that each voltage limiting circuit stage of a multi-stage HAZLOC clamp-on-demand voltage limiting circuit, if operating as expected, includes a voltage restriction device sufficient to drop the battery output voltage below the predefined maximum safe voltage, thus providing the triple redundancy required by the HAZLOC equipment protection standards.

In at least some embodiments, the operations shown in FIG. 5 may be repeated continuously to ensure that the voltage at which electrical power is supplied to the portable electronic device never exceeds the predefined maximum safe voltage for operation in a hazardous environment. In some embodiments, subsequent to determining that the battery output voltage is, or has been reduced to be, below the predefined maximum safe voltage, the comparator of the first stage voltage limiting circuit may determine that the battery output voltage has been increased, e.g., by being charged. If, or once, the comparator determines (at 506) that the battery output voltage is no longer below the predefined maximum safe voltage, various operations illustrated at 510 through 524 may be repeated, as appropriate, until the battery output voltage is again dropped below the predefined maximum safe voltage.

Figure 6:
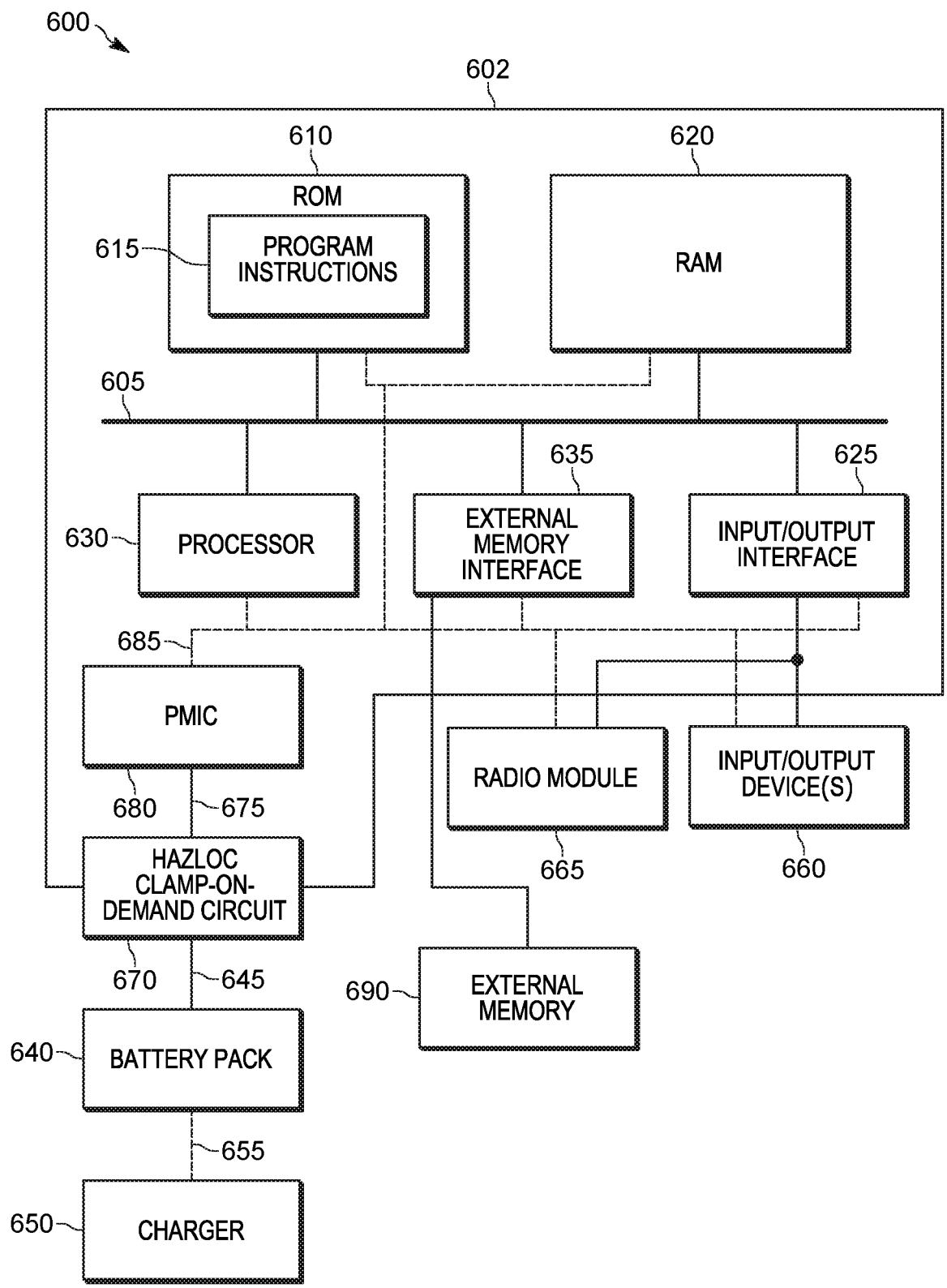
FIG. 6 is a block diagram illustrating selected elements of an example portable electronic communication device including a HAZLOC clamp-on-demand voltage limiting circuit, in accordance with some embodiments.

FIG. 6 is a block diagram illustrating selected elements of an example portable electronic communication device 600 including a HAZLOC clamp-on-demand voltage limiting circuit, in accordance with some embodiments. The example, portable electronic communication device 600 also includes a battery pack 640, a processing unit 602, an analog radio module 665, and one or more input/output devices 660, in accordance with some embodiments. Portable electronic communication device 600 may be any type of portable electronic communication device for which power can be supplied, at least at certain times, by battery pack 640. At certain times, battery pack 640 may be coupled to a charger 650 to charge the battery cells of battery pack 640 over a wired connection 655. In some embodiments, portable electronic communication device 600 may be a multifunction radio, a land mobile radio, a mobile telephone, or another type of portable electronic communication device configured for operating in a hazardous environment. In other embodiments, portable electronic communication device 600 may be or include a laptop computer, a tablet computer, a smart phone, a lighting system, a sound system, or another type of portable electronic device.

In some embodiments, battery pack 640 may include multiple battery cells with a combined maximum voltage rating that exceeds a predefined maximum safe voltage for operation of the portable electronic communication device in a hazardous environment. In various embodiments, battery pack 640 may be similar to battery pack 110 illustrated in FIG. 1 and may provide electrical power to processing unit 602, analog radio module 665, and one or more input/output devices 660 as the load. Battery pack 640 may also send data to or receive data from processing unit 602 over one or more data lines (not shown), in some embodiments. For example, a digital signal indicating a current or voltage measurement taken within battery pack 640 may be provided to processor 630 of processing unit 602 over such data lines, in some embodiments. In some embodiments, other operating parameters of battery pack 640 may be obtained by software operating on processing unit 602. For example, in some embodiments, the operating parameters of the battery pack 640, or of a particular battery cell, may be read from a memory within battery pack 640 that stores battery data by processing unit 602 (not shown). The operating parameters of the battery pack 640 or cell obtained by processing unit 602 may include, but are not limited to, a state-of-charge of the battery pack or a battery cell thereof, a battery cell type, a battery pack or battery cell topology, the available capacity of the battery pack or a battery cell thereof, a peak or present charging capacity of the battery pack or a battery cell thereof, a nominal voltage range for the battery pack or a battery cell thereof, the temperature of the battery pack or a battery cell thereof, an indication of the age of the battery pack or a battery cell thereof, the number of charge-discharge cycles the battery pack or battery cell has experienced, or a measure of impedance for the battery pack or a battery cell thereof.

As illustrated in this example embodiment, processing unit 602 may include a Read Only Memory (ROM) 610, a Random Access Memory (RAM) 620, an electronic processor 630, a power management integrated circuit (PMIC) 680, a HAZLOC clamp-on-demand voltage limiting circuit 670, an input/output interface 625, and an external memory interface 635, all of which are coupled to a system bus 605 through which they communicate with each other. In various embodiments, electronic processor 630 may include a microprocessor, a microcontroller, a system-on-chip, a field-programmable gate array, a programmable mixed-signal array or, in general, any system or sub-system that includes nominal memory and that is capable of executing a sequence of instructions in order to control hardware elements of portable electronic communication device 600. In this example embodiment, ROM 610 stores program instructions 615, at least some of which may be executed by electronic processor 630 to implement, in conjunction with analog radio module 665 and/or input/output devices 660, various functions of the portable electronic communication device. In some embodiments, program instructions 615 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In this example embodiment, RAM 620 may, from time to time, store data representing battery data or operating parameters of battery pack 640, or of particular battery cells thereof, to be used in performing various power management functions on behalf of portable electronic communication device 600. In some embodiments, RAM 620 may also store data used in performing other functions of the portable electronic communication device 600.

In the illustrated embodiment, HAZLOC clamp-on-demand voltage limiting circuit 670 is shown as an element at the power supply input of processing unit 602. HAZLOC clamp-on-demand voltage limiting circuit 670 may be similar to HAZLOC clamp-on-demand voltage limiting circuit 124 illustrated in FIG. 1, HAZLOC clamp-on-demand voltage limiting circuit 200 illustrated in FIG. 2, or HAZLOC clamp-on-demand voltage limiting circuit 300 illustrated in FIG. 3. In some embodiments, HAZLOC clamp-on-demand voltage limiting circuit 670 may be an element of an isolation circuit (not shown), which may also include a leakage controller. HAZLOC clamp-on-demand voltage limiting circuit 670 may receive electrical power 645 from battery pack 640 and may, when necessary, reduce the voltage at which the electrical power is supplied to other elements of portable electronic communication device 600 below a predefined maximum safe voltage for operating the portable electronic communication device 600 in a hazardous environment.

In various embodiments, HAZLOC clamp-on-demand voltage limiting circuit 670 may include, in each of one or more voltage limitation circuit stages, a respective MOSFET switch having a body diode in forward bias from its drain to its source and a respective comparator to determine whether the voltage at its input exceeds the predefined maximum safe voltage (not shown in FIG. 6). When and if the comparator determines that the input voltage exceeds the predefined maximum safe voltage, the comparator may deactivate the MOSFET switch enabling the body diode to reduce the input voltage by a fixed amount. When and if the comparator determines that the input voltage does not exceed the predefined maximum safe voltage, the comparator may activate the MOSFET switch, thus bypassing the body diode. In either case, the HAZLOC clamp-on-demand voltage limiting circuit 670 may be configured to supply electrical power 675 to the PMIC 680 at a voltage below the predefined maximum safe voltage for distribution by the PMIC 680 to other elements of the portable electronic communication device over power bus 685. In at least some embodiments, PMIC 680 may be similar to PMIC 130 illustrated in FIG. 1 and described above. For example, PMIC 130 may be a solid state device configured to further condition electrical power 675 received from HAZLOC clamp-on-demand voltage limiting circuit 670 and to provide the conditioned electrical power to the other elements of the portable electronic communication device over power bus 685.

In this example embodiment, input/output interface 625 may include one or more analog input interfaces, such as one or more A/D convertors, or digital interfaces for exchanging signals or data with analog radio module 665. Input/output interface 625 may also include interfaces through which processing unit 602 may be coupled to other elements of portable electronic communication device 600. For example, processing unit 602 may be coupled to input/output devices 660 that implement other functionality features of portable electronic communication device 600, such as a keyboard, a mouse, a touch panel, a switch, a microphone, a video camera, a display, a speaker, one or more sensors, and the like over input/output interface 625. In the illustrated example, processing unit 602 is shown coupled to a radio module 665 and one or more input/output devices 660.

External memory interface 635 may include one or more interfaces through which processing unit 602 may be coupled to an external memory 690. External memory 690 may include, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

The methods and apparatus described herein for dynamic battery voltage restriction for hazardous environments provide significant technical advantages over existing voltage restriction approaches. For example, the methods and apparatus described herein for dynamic voltage restriction in hazardous environments may enable a voltage restriction device to reduce the battery output voltage only when the battery output voltage exceeds the predefined maximum safe voltage for operation of a portable electronic device in which the methods and apparatus are deployed, and only by a single fixed amount that is sufficient to drop the battery output voltage below the predefined maximum safe voltage, even while providing triple redundancy. Unlike with some existing voltage limitation approaches, if and when the battery is sufficiently discharged to drop the voltage at which electrical power is supplied by the battery below the predefined maximum safe voltage, the voltage restriction device may be disabled. Therefore, the amount by which the battery operating capacity is reduced when the battery output voltage is reduced is significantly less than the amount by which the battery operating capacity is reduced when a voltage restriction circuit is always enabled and always applies the voltage reduction with triple redundancy. In other words, the MOSFET-based dynamic voltage limiting circuits described herein may limit the battery voltage to a predefined maximum safe voltage to meet HAZLOC equipment protection requirements, but once the battery voltage drops below the predefined maximum safe voltage threshold, the voltage limiting circuit no longer required and is disabled. In at least some embodiments, this approach maximizes the available battery capacity to be provided to the portable electronic device in which it is deployed, e.g., a land mobile radio. The voltage limiting circuits described herein utilize discrete passive components where active parts are not allowed.

Figure 7:
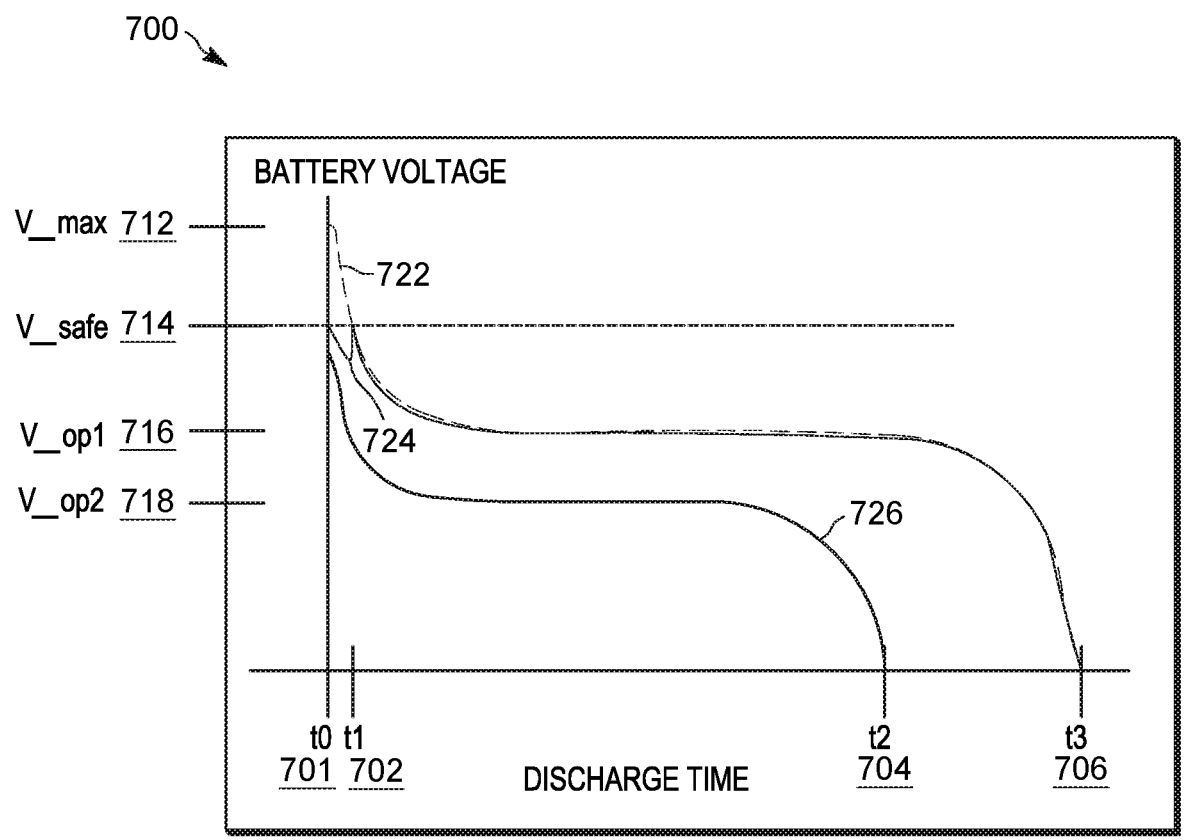
FIG. 7 is a graph illustrating battery capacity improvement in portable electronic devices that include a HAZLOC clamp-on-demand voltage limiting circuit, in accordance with some embodiments.

FIG. 7 is a graph 700 illustrating a battery capacity improvement in portable electronic devices that include a HAZLOC clamp-on-demand voltage limiting circuit, in accordance with some embodiments. In graph 700, which maps battery voltage vs. discharge time, the area under each curve represents the available battery operating capacity. In this example, the predefined maximum safe voltage is shown as V_safe 714 (e.g., 8.4V) and the maximum voltage rating for the battery that supplies electrical power to a portable electronic device is shown as V_max 712 (e.g., 8.8V).

Curve 722 illustrates battery voltage vs. discharge time for a portable electronic device in which no voltage restriction mechanisms are applied to the battery output voltage. Without any voltage restriction, the portable electronic device fails to meet HAZLOC requirements in the period between t0 (701), at which point the battery may be charged to the maximum voltage rating V_max 712, which exceeds the predefined maximum safe voltage V_safe 714, and time t1 (702), at which point the battery is sufficiently discharged to drop the battery output voltage below the predefined maximum safe voltage V_safe 714.

Curve 726 illustrates battery voltage vs. discharge time for a portable electronic device for which a voltage limiting circuit includes three diodes in series to meet triple redundancy requirements for operation in a hazardous environment. Each of the diodes provides a 0.4V voltage drop at all times and electrical power is supplied to the portable electronic device at a voltage that is 1.2V less than the voltage at which the electrical power is output by the battery. In this case, the electrical power is supplied at a voltage that will always be below V_safe 714. However, the portable electronic device will, for the majority of the period between time t0 (701), at which point the battery may be charged to the maximum voltage rating V_max 712, which exceeds the predefined maximum safe voltage V_safe 714, and time t2 (704), at which point the battery is fully discharged, operate in the flat portion of curve 726 at a battery voltage of V_op2 718. This may result in a battery operating capacity reduction of more than 20 percent compared to the case in which the battery voltage is not reduced.

Curve 724 illustrates the battery capacity improvement in a portable electronic device that includes a HAZLOC clamp-on-demand voltage limiting circuit, as described herein. The HAZLOC clamp-on-demand voltage limiting circuit may include multiple voltage limitation circuit stages for triple redundancy, any one of which may be configured to reduce the battery voltage by an amount sufficient to drop it below the predefined maximum safe voltage. Here, a single voltage limitation circuit stage may provide a 0.4V voltage drop only in the period between time t0 (701), at which point the battery may be charged to the maximum voltage rating V_max 712, which exceeds the predefined maximum safe voltage V_safe 714, and time t1 (702), at which point the battery has discharged enough to drop the output voltage below V_safe 714 and the voltage limitation circuit is disabled. The flat portion of curve 724 is significantly extended compared to the flat portion of curve 726, with the battery not being fully discharged until time t3 (706). In addition, in the flat portion of curve 724, the portable electronic device operates at a battery voltage shown as V_op1 716, which is significantly higher than V_op2 718. As illustrated in FIG. 7, the disclosed methods and apparatus allows the portable electronic device to retain much more of the battery's operating capacity than does a portable electronic device in which a voltage limiting circuit includes three diodes in series.

In at least some embodiments, the deployment of the methods and apparatus described herein for dynamic battery voltage restriction for hazardous environments may maximize the available battery operating capacity of batteries with maximum voltage ratings that exceed an applicable predefined maximum safe voltage, while meeting HAZLOC requirements for triple redundancy and the use of passive hardware devices to control the voltage restriction devices. The methods and apparatus may be implemented in a portable communication device, such as a land mobile radio, to detect the battery output voltage level and, only if the battery output voltage level exceeds the applicable predefined maximum safe voltage, to enable a voltage restriction circuit to reduce the voltage at which electrical power is supplied to the land mobile radio circuitry. In at least some embodiments, the dynamic voltage limiting circuits described herein may include multiple voltage limitation circuit stages that can be enabled individually or collectively to reduce the voltage by an amount sufficient to drop it below the applicable predefined maximum safe voltage. The dynamic voltage limiting circuits described herein may include a bypass mode that is enabled when the battery voltage has dropped below the applicable predefined maximum safe voltage to bypass the voltage restriction device (e.g., a body diode) that provides a fixed voltage drop when operating in the voltage restriction mode. The selection of the voltage restriction mode and the selection of the bypass mode, which are mutually exclusive, are controlled by passive hardware devices independent of any software executing on the portable electronic device. The dynamic voltage limiting circuits described herein may be further isolated from surrounding components through layout techniques. In one example, the dynamic voltage limiting circuits described herein may allow a land mobile radio in which the total capacitance is very limited to meet the HAZLOC equipment protection requirements while maximizing available battery operating capacity.

While several example embodiments described herein include battery packs with a maximum voltage rating of 8.8V or 9.6V and MOSFET switches including body diodes configured to reduce the battery voltage by 0.4V or 1.2V, in other embodiments, the methods and apparatus described herein for dynamic battery voltage restriction for hazardous environments may be deployed where a battery pack has an even higher maximum voltage rating by selecting MOSFET switches with body diodes configured to reduce the battery voltage by fixed amounts that are higher than 1.2V. In still other embodiments, the methods and apparatus described herein for dynamic battery voltage restriction for hazardous environments may be deployed where a battery pack has an even higher maximum voltage rating by increasing the number of voltage limiting circuit stages that can contribute to an overall voltage reduce sufficient to drop the battery voltage below the applicable predefined maximum safe voltage when necessary. For example, while several example embodiments described herein include HAZLOC clamp-on-demand voltage limiting circuits having three voltage limiting circuit stages, in other embodiments, the number of voltage limiting circuit stages may be greater than three.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:

1. A method for providing on-demand reduction of battery output voltage, comprising:
determining, prior to supplying electrical power from a battery to a portable electronic device, that a voltage delivered by the battery exceeds a predefined maximum safe voltage for operation of the portable electronic device in a hazardous environment;
in response to determining that the voltage delivered by the battery exceeds the maximum safe voltage:
enabling a first voltage restriction circuit in a supply line between the battery and the portable electronic device to reduce the voltage delivered by the battery below the maximum safe voltage; and
supplying electrical power to the portable electronic device at the reduced voltage;
determining, subsequent to enabling the first voltage restriction circuit, that the voltage delivered by the battery no longer exceeds the maximum safe voltage; and
in response to determining that the voltage delivered by the battery no longer exceeds the maximum safe voltage:
disabling the first voltage restriction circuit.

2. The method of claim 1, wherein operation of the first voltage restriction circuit is controlled by one or more passive devices.

3. The method of claim 1, wherein enabling the first voltage restriction circuit comprises deactivating a metal-oxide-semiconductor field-effect transistor (MOSFET) switch that includes a forward biased body diode.

4. The method of claim 3, wherein:
the first voltage restriction circuit comprises the forward biased body diode; and
when enabled, the forward biased body diode is configured to reduce the battery voltage across the supply line by a fixed amount.

5. The method of claim 4, wherein disabling the first voltage restriction circuit comprises:
activating the MOSFET switch; and
supplying electrical power to the portable electronic device while bypassing the body diode.

6. The method of claim 1, wherein:
the first voltage restriction circuit is one of a plurality of voltage restriction circuits in the supply line between the battery and the portable electronic device;
the method further comprises, prior to enabling the first voltage restriction circuit, enabling a second voltage restriction circuit in the supply line between the battery and the first voltage restriction circuit to reduce the battery voltage across the supply line by a fixed amount; and
determining that the voltage delivered by the battery exceeds the maximum safe voltage comprises determining that a reduction of the battery voltage across the supply line by the second voltage restriction circuit was not sufficient to reduce the voltage delivered by the battery below the maximum safe voltage.

7. A voltage limiting circuit, comprising:
a first metal-oxide-semiconductor field-effect transistor (MOSFET) switch of a first voltage restriction stage of the voltage limiting circuit in a battery supply line, the first MOSFET switch including a first forward biased body diode configured to reduce a voltage delivered by a battery across the battery supply line by a first fixed amount while the first MOSFET switch is deactivated; and
a first comparator circuit of the first voltage restriction stage communicatively coupled to the first MOSFET switch and configured to:
determine whether the voltage delivered by the battery exceeds a predefined maximum safe voltage for operation of a portable electronic device in a hazardous environment;
output a first control signal to deactivate the first MOSFET switch responsive to a determination that the voltage delivered by the battery exceeds the predefined maximum safe voltage; and
output a second control signal to activate the first MOSFET switch responsive to a determination that the voltage delivered by the battery does not exceed the predefined maximum safe voltage.

8. The voltage limiting circuit of claim 7, wherein the first comparator circuit is further configured to:
determine, subsequent to outputting the first control signal, that the voltage delivered by the battery no longer exceeds the predefined maximum safe voltage for operation of the portable electronic device in the hazardous environment; and
output the second control signal to activate the first MOSFET switch responsive to the determination that the voltage delivered by the battery no longer exceeds the predefined maximum safe voltage.

9. The voltage limiting circuit of claim 7, further comprising:
a second MOSFET switch of a second voltage restriction stage of the voltage limiting circuit following the first voltage restriction stage in the battery supply line, the second MOSFET switch including a second forward biased body diode configured to reduce the voltage delivered to the second voltage restriction stage across the supply line by a second fixed amount while the second MOSFET switch is deactivated; and
a second comparator circuit of the second voltage restriction stage communicatively coupled to the second MOSFET switch and configured to:
determine whether the voltage delivered to the second voltage restriction stage exceeds the predefined maximum safe voltage;
output a third control signal to deactivate the second MOSFET switch responsive to a determination that the voltage delivered to the second voltage restriction stage exceeds the predefined maximum safe voltage;
output a fourth control signal to activate the second MOSFET switch responsive to a determination that the voltage delivered to the second voltage restriction stage does not exceed the predefined maximum safe voltage.

10. The voltage limiting circuit of claim 9, wherein the first fixed amount and the second fixed amount are substantially the same.

11. The voltage limiting circuit of claim 9, further comprising:
a third MOSFET switch of a third voltage restriction stage of the voltage limiting circuit following the second voltage restriction stage in the battery supply line, the third MOSFET switch including a third forward biased body diode configured to reduce the voltage delivered to the third voltage restriction stage across the supply line by a third fixed amount while the third MOSFET switch is deactivated; and a third comparator circuit of the third voltage restriction stage communicatively coupled to the third MOSFET switch and configured to:
determine whether the voltage delivered to the third voltage restriction stage exceeds the predefined maximum safe voltage;
output a fifth control signal to deactivate the third MOSFET switch responsive to a determination that the voltage delivered to the third voltage restriction stage exceeds the predefined maximum safe voltage;
output a sixth control signal to activate the third MOSFET switch responsive to a determination that the voltage delivered to the third voltage restriction stage does not exceed the predefined maximum safe voltage.

12. The voltage limiting circuit of claim 7, wherein the first comparator circuit comprises an internal reference voltage whose value is dependent on the predefined maximum safe voltage.

13. The voltage limiting circuit of claim 7, wherein the voltage limiting circuit is an element of the battery.

14. The voltage limiting circuit of claim 7, wherein:
the portable electronic device is coupled to the battery and configured to receive electrical power from the battery; and
the voltage limiting circuit is an element of the portable electronic device.

15. A portable electronic communication device, comprising:
a battery having a voltage rating greater than a predefined maximum safe voltage for operation of the portable electronic communication device in a hazardous environment and configured to supply electrical power to functional elements of the portable electronic communication device; and
a voltage limiting circuit, comprising:
a first metal-oxide-semiconductor field-effect transistor (MOSFET) switch of a first voltage restriction stage of the voltage limiting circuit in a battery supply line between the battery and the functional elements of the portable electronic communication device, the first MOSFET switch including a first forward biased body diode configured to reduce a voltage delivered by a battery across the battery supply line by a first fixed amount while the first MOSFET switch is deactivated; and
a first comparator circuit of the first voltage restriction stage communicatively coupled to the first MOSFET switch and configured to:
determine whether the voltage delivered by the battery exceeds the predefined maximum safe voltage for operation of the portable electronic device in a hazardous environment;
output a first control signal to deactivate the first MOSFET switch responsive to a determination that the voltage delivered by the battery exceeds the predefined maximum safe voltage; and
output a second control signal to activate the first MOSFET switch responsive to a determination that the voltage delivered by the battery does not exceed the predefined maximum safe voltage.

16. The portable electronic communication device of claim 15, wherein the first comparator circuit is further configured to:
determine, subsequent to outputting the first control signal, that the voltage delivered by the battery no longer exceeds the predefined maximum safe voltage for operation of the portable electronic device in the hazardous environment; and
output the second control signal to activate the first MOSFET switch responsive to the determination that the voltage delivered by the battery no longer exceeds the predefined maximum safe voltage.

17. The portable electronic communication device of claim 15, wherein the voltage limiting circuit further comprises one or more additional voltage restriction stages, each of which includes:
a respective MOSFET switch of the additional voltage restriction stage, the respective MOSFET switch including a respective forward biased body diode configured to reduce the voltage delivered to the additional voltage restriction stage across the supply line by a respective fixed amount while the respective MOSFET switch is deactivated; and
a respective comparator circuit of the additional voltage restriction stage communicatively coupled to the respective MOSFET switch and configured to:
determine whether the voltage delivered to the additional voltage restriction stage exceeds the predefined maximum safe voltage;
output a respective deactivation control signal to deactivate the respective MOSFET switch responsive to a determination that the voltage delivered to the additional voltage restriction stage exceeds the predefined maximum safe voltage;
output a respective activation control signal to activate the respective MOSFET switch responsive to a determination that the voltage delivered to the additional voltage restriction stage does not exceed the predefined maximum safe voltage.

18. The portable electronic communication device of claim 15, further comprising a power management device through which electrical power supplied by the battery and delivered to the voltage limiting circuit across the supply line is delivered to the functional elements of the portable electronic communication device at a voltage that does not exceed the predefined maximum safe voltage.

19. The portable electronic communication device of claim 15, further comprising an isolation circuit between the battery and the functional elements of the portable electronic communication device in the supply line, the isolation circuit configured to prevent delivery of electrical power to the functional elements of the portable electronic communication device at a voltage that exceeds the predefined maximum safe voltage;
wherein the voltage limiting circuit is an element of the isolation circuit.

20. The portable electronic communication device of claim 15, wherein the battery is a multi-cell battery having a combined voltage rating greater than the predefined maximum safe voltage.

* * * * *